US008774707B2

(12) United States Patent
Flammer, III et al.

(10) Patent No.: US 8,774,707 B2
(45) Date of Patent: Jul. 8, 2014

(54) UTILITY GRID WIRELESS NODE WITH POWERED EMERGENCY DEVICE

(75) Inventors: George Flammer, III, Cupertino, CA (US); Eli Marlin, Daly City, CA (US)

(73) Assignee: Silver Spring Networks, Inc., Reswood City, CA (US)

( * ) Notice: Subject to any disclaimer, the term of this patent is extended or adjusted under 35 U.S.C. 154(b) by 265 days.

(21) Appl. No.: 13/328,764

(22) Filed: Dec. 16, 2011

(65) Prior Publication Data
US 2013/0157559 A1 Jun. 20, 2013

(51) Int. Cl.
H04B 3/36 (2006.01)
H04B 7/14 (2006.01)

(52) U.S. Cl.
USPC ............. 455/7; 455/9; 455/572; 340/425.1; 340/425.2; 340/693.1; 340/693.2; 340/691.6

(58) Field of Classification Search
USPC ........ 455/7, 9, 572; 340/691.1–691.6, 425.1, 340/539.1, 693.1, 693.2, 425.2; 315/86
See application file for complete search history.

(56) References Cited

U.S. PATENT DOCUMENTS

| 4,531,114 | A  | * | 7/1985  | Topol et al. ............... 340/539.1 |
|-----------|----|---|---------|---------------------------------------|
| 6,400,968 | B1 | * | 6/2002  | White et al. .................. 455/572 |
| 6,437,692 | B1 | * | 8/2002  | Petite et al. .................. 340/540 |
| 7,199,701 | B2 | * | 4/2007  | Kates ......................... 340/425.1 |
| 7,817,063 | B2 | * | 10/2010 | Hawkins et al. .......... 340/870.07 |
| 2001/0024163 | A1 | * | 9/2001  | Petite .............................. 340/628 |
| 2002/0140360 | A1 | * | 10/2002 | Crenshaw ..................... 315/149 |
| 2003/0199247 | A1 | * | 10/2003 | Striemer ..................... 455/11.1 |
| 2005/0164630 | A1 | * | 7/2005  | Kates ......................... 455/11.1 |
| 2005/0227616 | A1 | * | 10/2005 | Takatani et al. ............. 455/11.1 |
| 2006/0056368 | A1 | * | 3/2006  | Ratiu et al. .................... 370/338 |
| 2006/0261971 | A1 | * | 11/2006 | Danvir et al. ............. 340/691.1 |
| 2012/0126700 | A1 | * | 5/2012  | Mayfield et al. ................ 315/86 |

* cited by examiner

Primary Examiner — Gennadiy Tsvey
(74) Attorney, Agent, or Firm — Patterson + Sheridan, LLP

(57) ABSTRACT

A wireless node that bridges a wireless communications gap between a first wireless device, such as a smart meter, and a wireless network, such as a smart grid network, by repeating wireless communications received by the wireless node. The wireless node is integrated with another powered device common to buildings to provide a clandestine improvement to wireless communications. Additionally, the wireless node may effect testing of the powered device and provide results of the test wirelessly to remote devices. The wireless node may take the form of an exit sign, an emergency light, a speaker, and a combination of one or more of these devices. The wireless node may also track power consumption of the repeater portion of the wireless node to provide billing credit to power consumers.

25 Claims, 9 Drawing Sheets

UTILITY GRID WIRELESS NODE WITH POWERED EMERGENCY DEVICE

FIELD OF THE INVENTION

The invention relates to systems and methods for improving wireless network communication.

SUMMARY

Utility meters are often positioned within buildings in areas that are not conducive to wireless communications in a wireless network (e.g., a smart grid network, a cellular network, or another machine-to-machine ("m2m") communication network). For instance, utility meters may be located in closets that are occupied by other electronic equipment, including electronic equipment that generates electronic interference. Additionally, the utility closets may be located far from the perimeter of the building, requiring wireless transmissions to pass through obstacles (e.g., walls, floors, and other building structure) before reaching open airspace outside of the building where wireless transmissions generally face less interference. Thus, wireless communications between smart utility meters and a nearby smart grid are often degraded, corrupted, or otherwise prevented from being successfully transmitted and received.

Embodiments of the present invention include a wireless node that bridges a wireless communications gap between a smart meter and a smart grid. The wireless node is integrated with another powered device common to buildings to provide a clandestine improvement to wireless communications with no visual footprint. Additionally, the wireless node may effect testing of the powered device and provide results of the test wirelessly to remote devices.

In one embodiment, the invention provides a wireless node for receiving and transmitting wireless communications in an environment having an external power source. The wireless node includes a power terminal for coupling to the external power source and a powered emergency device (PED) housing at least partially housing a PED coupled to the power terminal. The PED at least one of conveys audio information, conveys visual information, and provides illumination to an area outside of the PED housing. The wireless node further includes a repeater within the PED housing and coupled to the power terminal. The repeater includes an antenna, and a repeater controller coupled to the antenna. The repeater controller receives wireless communications from a first device via the antenna, and repeats the wireless communications to a second device via the antenna.

In another embodiment, the invention provides a method of repeating wireless communications from a wireless device to a wireless access point with a wireless node. The wireless node includes a powered emergency device (PED) housing with a PED, a power terminal for coupling to an external power source, an AC/DC converter, a battery, and a repeater including an antenna and a repeater controller. The repeater is within the PED housing. The method includes receiving, from the external power supply, AC power at the power terminal and converting the AC power to DC power with the AC/DC converter. The DC power is supplied to the repeater controller and to the powered emergency device. The antenna receives wireless communications from the wireless device and outputs the wireless communications to the wireless access point. The method further includes detecting a power outage of the external power source, supplying DC power from the battery to the powered emergency device, and controlling the powered emergency device to at least one of convey audio information, convey visual information, and provide illumination to an area outside of the housing.

In another embodiment, the invention provides a method of installing a wireless node in a smart grid communications network. The method includes positioning a smart grid meter, including a wireless communication module, outside of wireless communication range of a smart grid wireless access point. The method further includes positioning the wireless node within wireless communication range of both the smart grid wireless access point and the smart grid meter. The wireless node includes a housing, a power terminal for coupling to an external power source, an AC/DC converter, a battery, a repeater including an antenna and a repeater controller, and a powered emergency device, wherein the power terminal, the AC/DC converter, the battery, the repeater, and the powered emergency device are within the housing. Additionally, the wireless node receives wireless communications from the smart grid meter via an antenna, and repeats the wireless communications to the wireless access point via the antenna.

Embodiments of the invention enable improving wireless communications between smart meters and a smart grid network. Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Figure 1:
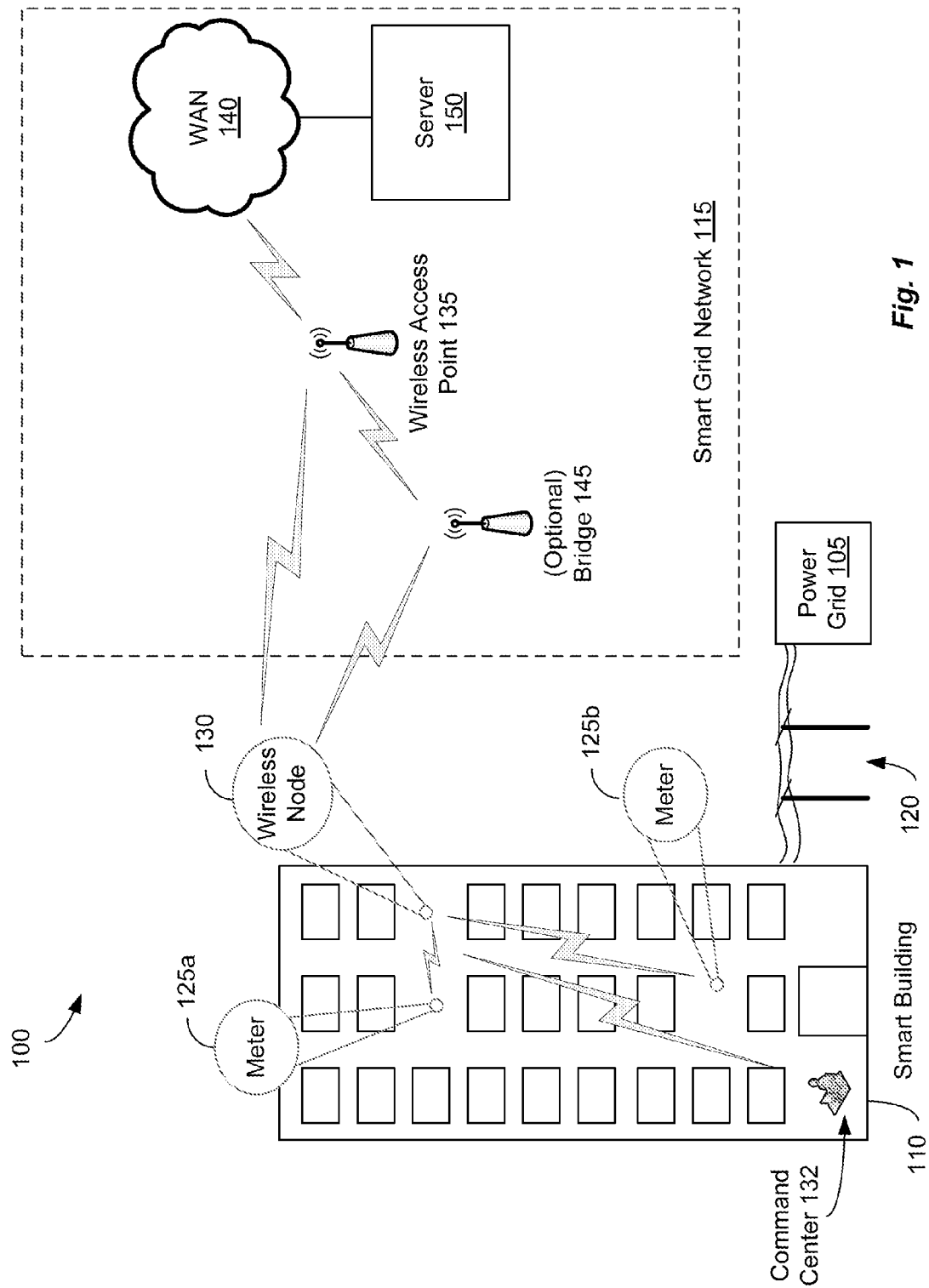
FIG. 1 illustrates a smart grid communication network including a wireless node according to embodiments of the invention.

FIG. 1 depicts a smart grid communication network 100 including a power grid 105, a smart building 110, and a smart grid network 115. The power grid 105 provides power to the smart building 110 via power lines 120. Smart meters 125 (125a and 125b) are positioned within the building 110 to monitor and track power consumption and, in some instances, power generation, attributed to the building 110 or a portion thereof. The building 110 further includes a wireless node 130. The wireless node 130 extends the distance that the meters 125 and the smart grid network 115 may wirelessly communicate by receiving wireless communications and repeating or routing the received wireless communications.

The smart grid network 115 includes a wireless access point (WAP) 135 in wireless communication with a wide-area-network (WAN) 140, such as the Internet, and can also include a bridge 145 in communication with the WAP 135. The wireless node 130 in the illustrated embodiment is operable to communicate with both the WAP 135 and the bridge 145. The bridge 145 may be coupled to another device (e.g., power equipment on the power grid) that, without the bridge 145, ordinarily is not operable to communicate over the smart grid network 115. The bridge 145 also acts as a repeater device, like a typical relay, to further extend the distance across which the meters 125 and the WAP 135 may wirelessly communicate.

The WAN 140 in FIG. 1 is in communication with a server 150. The server 150 is representative of a back office system that collects data from nodes of the smart grid network 115, such as meters 125, and transmits data and commands to the nodes of the smart grid network 115. The server 150 and the received data can be accessible via client devices (not shown) in communication with the server 150 via the WAN 140, or otherwise. Furthermore, client devices can provide commands to the server 150. In some instances, the server 150 provides a website accessible by web browsers of the client devices. Client devices may include smart phones, laptops, tablets, personal computers, etc.

Figure 2A:
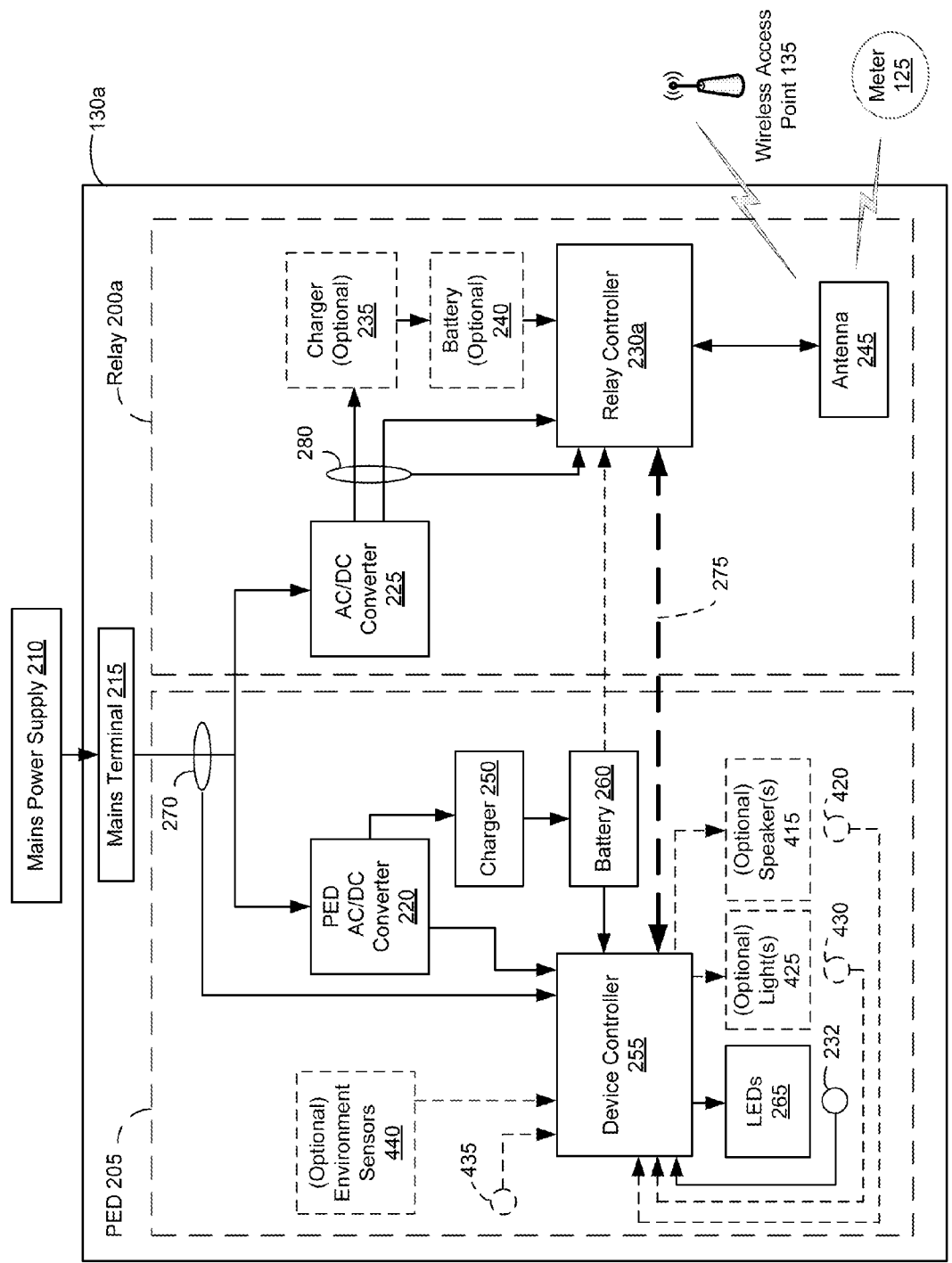
FIG. 2A illustrates a wireless node of the smart grid communication network of FIG. 1 including a relay.

FIG. 2A illustrates a wireless node 130a (an exemplary wireless node 130) in greater detail. The illustrated wireless node 130a includes both a relay 200a and a powered emergency device (PED) 205 sharing the same mains power supply 210. The mains power supply 210 can be coupled to the power grid 105 via power lines 120 (see FIG. 1) and other power electronics equipment of the building 110 (e.g., circuit breaker panels, transformers, etc.). The mains power supply 210 in the illustrated embodiment is an AC power source that provides, for example, 120 V or 240 V at 50 or 60 Hz, although other power voltages and frequencies are possible. Also in the illustrated embodiment, the wireless node 130a is coupled to the mains power supply 210 by mains terminal 215, although other (e.g., direct or indirect) connections to the mains power supply 210 are possible.

The mains terminal 215 shown in FIG. 2A is coupled to two AC/DC converters: powered emergency device (PED) AC/DC converter 220 and AC/DC converter 225. The AC/DC converters 220 and 225 receive AC power from the mains power supply 210, and convert the AC power to DC power for use by internal circuitry of the wireless node 130a. The AC/DC converter 225 converts AC power to DC power for supply to a relay controller 230a and, if present, an optional charger 235. When included in the relay 200a, the charger 235 applies the received DC power to charge a battery 240 used to provide backup power to the relay controller 230a in the event of an interruption in power from the mains power supply 210. Accordingly, with the optional charger 235 and battery 240, the relay controller 230a may continue to operate if a power outage occurs until the battery 240 is discharged.

The relay controller 230a is coupled to an antenna 245 for transmitting wireless communications to the meter 125 and WAP 135 (or bridge 145) shown in FIG. 1, and for receiving wireless communications from the meter 125 and WAP 135 (or bridge 145).

The PED AC/DC converter 220 of FIG. 2A provides DC power to a charger 250 and a device controller 255. The charger 250 applies the received DC power to charge a battery 260, which can be used to provide backup power for the PED 205 in the event of a power outage. In some embodiments, the wireless node 130a does not include charger 250, battery 260, charger 235, or battery 240; rather, the wireless node 130a is powered by mains power supply 210 and/or another power supply (e.g., backup generator, photovoltaic cells, etc.). The device controller 255 in the illustrated embodiment controls and monitors the components of the PED 205, including the LEDs 265, the charger 250, and the battery 260 (e.g., the discharge of the battery 260). The device controller 255 further controls the enabling and disabling of LEDs 265.

The device controller 255 of the illustrated embodiment also monitors components of the wireless node 130a to obtain monitored data. For example, the illustrated device controller 255 is coupled to a power sensor 270 for monitoring AC power from the mains power supply 210. Based on output of the power sensor 270, the device controller 255 is able to detect when AC power is being provided by the mains power supply 210, and when a power outage exists. The power sensor 270 may be a current sensor or another type of sensor able to monitor the mains power supply 210. Also in the illustrated embodiment, the device controller 255 is further operable to monitor the state of charge of the battery 260, monitor whether the charger 250 is charging, and/or monitor whether the LEDs 265 are providing illumination (e.g., via a light sensor 232). In some instances, the device controller 255 performs analysis of the monitored data to generate analysis data. The analysis data and monitored data are collectively referred to as "monitored data."

The device controller 255 of the illustrated embodiment of FIG. 2A is coupled to the relay controller 230a via a communication bus 275. The device controller 255 sends the monitored data to the relay controller 230a for output to the smart grid network 115. The device controller 255 also receives data and commands from the smart grid network 115 via the communication bus 275 and relay controller 230. In other embodiments, the device and relay controllers 255, 230a do not communicate with one another. In still other embodiments, the device and relay controllers 255, 230a are defined by a single controller.

The relay controller 230a in the illustrated embodiment of FIG. 2A is coupled to a power sensor 280 (e.g., a current sensor) for monitoring power usage of the relay 200a. As the power sensor 280 is positioned after the AC/DC converter 225, power loss in the conversion from AC to DC power is not measured. Accordingly, when determining power consumption of the relay 200a, the relay controller 230a may factor in power loss, which can be an estimated value.

Figure 2B:
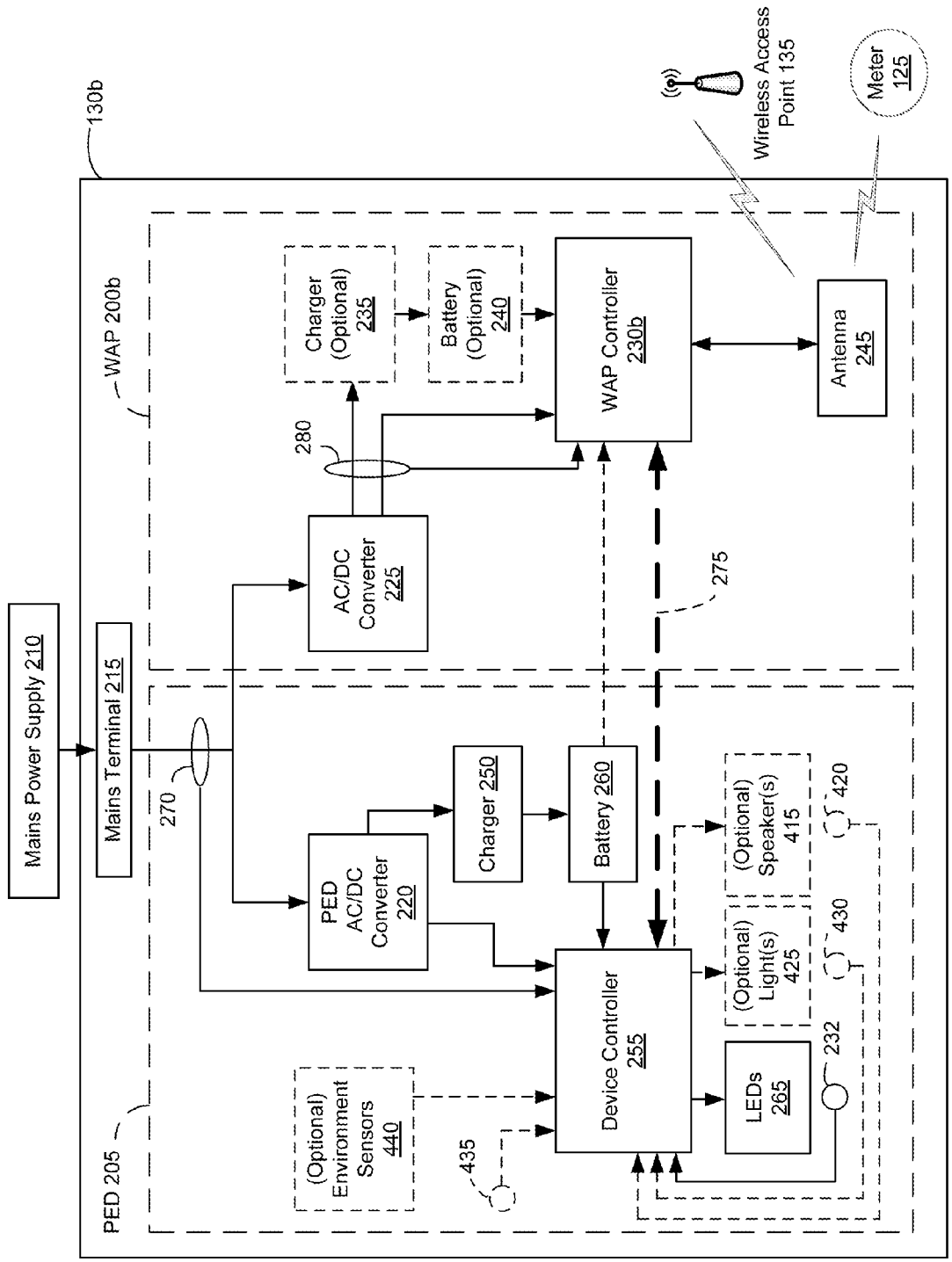
FIG. 2B illustrates a wireless node of the smart grid communication network of FIG. 1 including a wireless access point.

FIG. 2B illustrates a wireless node 130b (another exemplary wireless node 130) in greater detail. The illustrated wireless node 130b is similar to the wireless node 130a except that the relay 200a is replaced with a WAP 200b. The WAP 200b includes components similar to the relay 200a, except that the relay controller 230a is replaced with a WAP controller 230b. Both the relay 200a and WAP 200b repeat wireless communications received from a first device (e.g., meter 125) to a second device (e.g., the WAP 135). In contrast to the relay 200a, however, the WAP 200b is operable to receive wireless communications, and particularly route the wireless communications (e.g., according to an address), rather than relaying the wireless communications to any listening devices in range. Nevertheless, the relay 200a and WAP 200b may each be referred to as a repeater 200. The relay 200a may also be referred to as a bridge, as it both relays wireless communications and includes additional functionality described herein, such as sensing environmental characteristics. In some instances, the WAP 200b may be programmed to act as relay 200a and re-broadcast messages without particularly routing them.

Figure 3:
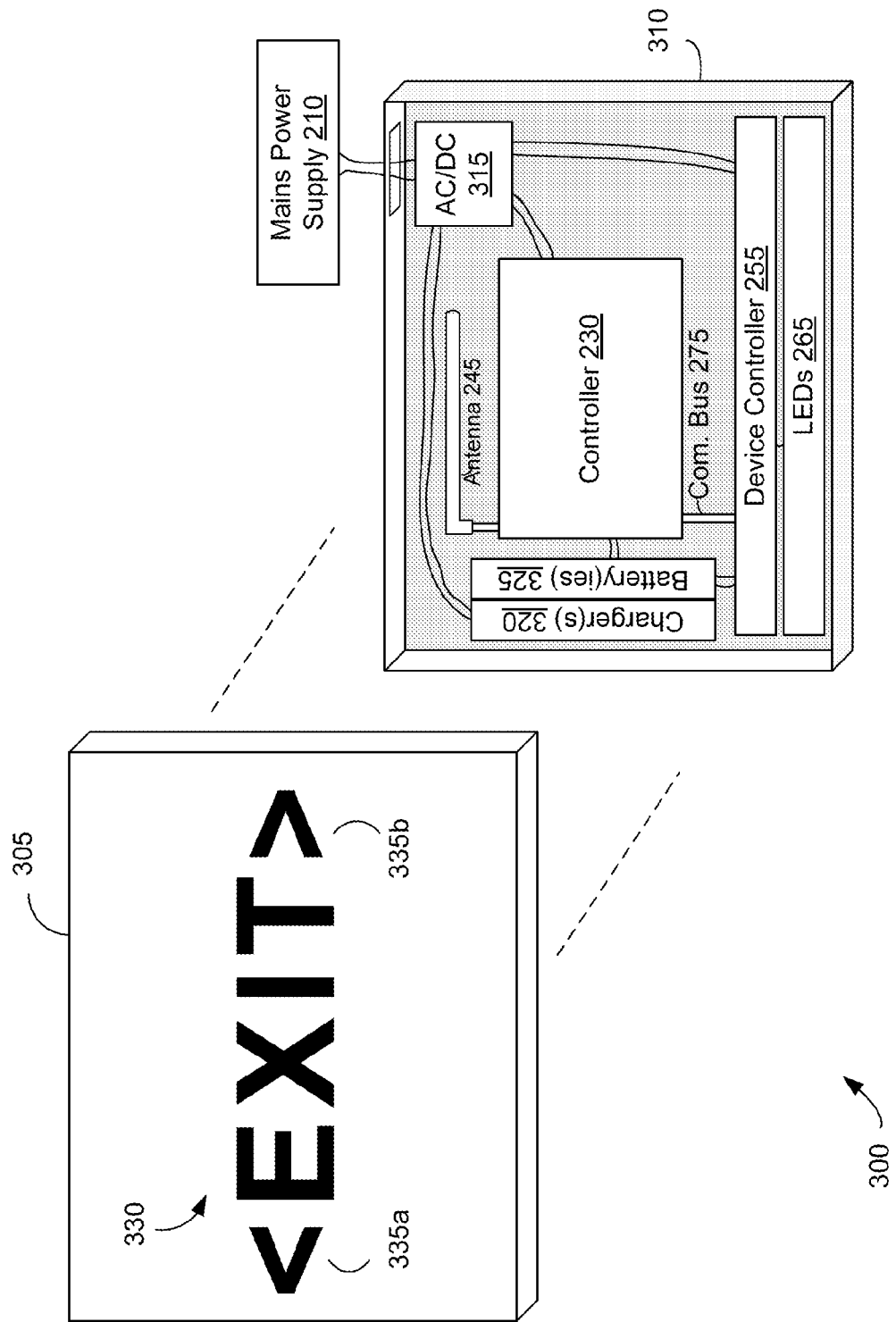
FIG. 3 illustrates an exit sign relay.

FIG. 3 illustrates an exit sign repeater 300, which is an example of the wireless node 130. The exit sign repeater 300 includes a front cover 305 with a textual message ("EXIT") that is illuminated by the LEDs 265 (when enabled). The exit sign repeater 300 also includes a back cover 310 to which the components of the wireless node 130a depicted in FIGS. 2A-B are mounted (although not all components are shown). The PED AC/DC converter 220 and AC/DC converter 225 are illustrated as a single AC/DC converter 315, but, in some embodiments, the AC/DC converter 315 is implemented with two distinct converters as illustrated in FIGS. 2A-B. Similarly, the chargers 235 and 250 and the batteries 240 and 260 are illustrated as a single charger 320 and single battery 325, respectively. However, in some embodiments, the charger 320 and battery 325 are implemented as two distinct components each, as illustrated in FIGS. 2A-B.

When enabled, the LEDs 265 provide illumination that is, at least in part, directed outside of the housing (i.e., the front cover 305 of the device shown in FIG. 3, and toward the back cover 310 in those sign embodiments that are two-sided). The front cover 305 and back cover 310 of the exit sign repeater 300 are generally opaque except for the message portion 330 that spells "EXIT." The message portion is generally constructed using a colored transparent, semitransparent, or translucent plastic. Thus, when the LEDs 265 are illuminated, light is transmitted through the message portion 330 to illuminate the word EXIT such that it is visible even in a dark area. In some instances, the text (i.e., "EXIT") appears red. The message portion 330 also includes arrows 335a and 335b. The arrows 335a and 335b may be selectively used to indicate a direction (e.g., left or right) of a nearby exit. The arrows 335a and 335b may be selectively illuminated, for instance, by appropriately positioning and enabling LEDs 265, or by positioning an opaque material to block light from transmitting through one of the arrows 335a and 335b. In some instances, the front cover 305 and/or the back cover 310 are semitransparent or translucent such that they are illuminated by the LEDs 265 as well. The front cover 305 and/or the back cover 310 may be selected such that they appear illuminated as a color that contrasts with the message portion 330 (e.g., white) to ensure that the message portion 330 is more easily read. Other textual messages, such as "NO EXIT," or symbols may be illuminated in addition to or in place of "EXIT." Additionally, the front cover 305 may have a different illuminated message than the back cover 310.

In some embodiments, rather than the message portion 330 being static, the message portion 330 may be a controllable dynamic message portion. For instance, an LED display screen (not shown) may be included on the front cover 305 and/or the back cover 310, which is controllable by the device controller 255. The device controller 255 stores various textual messages, which may be dynamically displayed depending on the status of the exit sign repeater 300 and the surrounding area. For instance, the textual messages may display "NO EXIT," "FIRE HAZARD," "FIRE DRILL—TEST," or other various messages as appropriate. In some instances, the device controller 255 receives messages or commands to display particular messages via antenna 245 and displays the messages on the dynamic message portion. The messages may originate from one of the command center 132 or server 150.

As noted above, smart meters, such as meters 125, may have difficulty wirelessly communicating with the smart grid network 115 when the meters 125 are located in certain areas in a building 110. For instance, meters 125 may have difficulty wirelessly communicating when located within a utility closet limiting wireless signal transmission, positioned a significant distance from an exterior wall of building 110, or positioned in an underground level of the building 110. Exit signs, however, are often located in areas of the building 110 that are more favorable to wireless communications with the smart grid network 115 (e.g., nearer to an exterior wall of the building 110 and above most office/retail space clutter). By integrating the repeater 200 with the PED 205 as described herein, such as to form the exit sign repeater 300, the repeater 200 may act to bridge wireless communication gaps between the meters 125 and the smart grid network 115. Additionally, in the exit sign repeater 300, the repeater 200 may be hidden in what appears to be a traditional exit sign. Thus, by using a clandestine repeater 200, aesthetic concerns of adding a relay within the building 110 are avoided. Moreover, the exit sign repeater 300 (including repeater 200) is able to use the mains power supply 210 that is typically already available for a traditional exit sign within the building 110. Accordingly, the repeater 200 may "piggy-back" on resources available to an already-necessary power consuming device (an exit sign) without needing to add power infrastructure, such as wiring, outlets, etc., to the building 110.

Further still, the PED 205 of the exit sign repeater 300 (i.e., the exit sign components) may use the wireless communication abilities of the repeater 200. For example, the device controller 255 can monitor the battery 260, charger 250, and LEDs 265 to detect proper functionality and current status (e.g., state of charge of the battery 260). Based upon such monitoring, the device controller 255 is operable to generate and transmit monitored data to the controller 230 via the communication bus 275. The controller 230 refers to the relay controller 230a and the WAP controller 230b depending on whether the wireless node 130 is a relay node 130a or WAP node 130b. The monitored data can then be exported to a remote device, such as the command center 132 within the building 110 (see FIG. 1). The command center 132 may route the monitored data to a remote device (e.g., via the Internet), make the monitored data available as part of a web site, or otherwise enable the monitored data to be remotely accessible. The monitored data may also be exported to the server 150 and added to a website by the server 150 such that a client may access the monitored data via a web browser. In some embodiments, the monitored data is automatically input to one or more other systems (e.g., building emergency or maintenance computer systems) to automatically trigger desired events, such as an alarm to building maintenance personnel, sign vendors, wireless equipment vendors, utility personnel, and the like.

Figure 4:
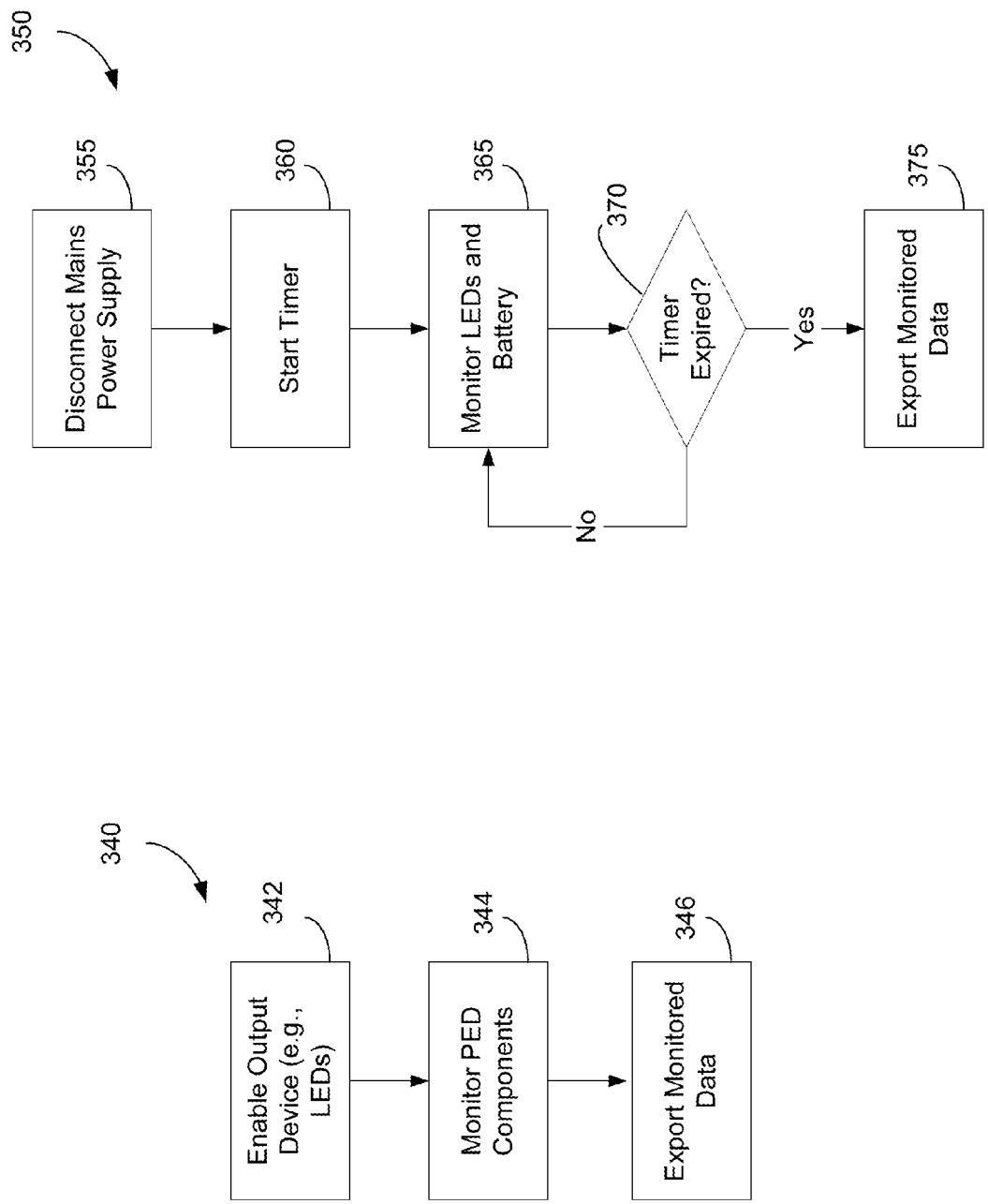
FIG. 4 illustrates methods of testing powered emergency devices.

The device controller 255 may also be used for periodic or random testing of the PED 205, whether self-initiated by the device controller 255 or as requested from an external device, such as the command center 132 or server 150. Testing of any desired duration and completeness is possible. A method 340 for conducting a relatively short test of the exit sign repeater 300 is illustrated in FIG. 4. In step 342, the device controller 255 enables an output device of the PED 205, such as the LEDs 265. In step 344, the device controller 255 monitors the components of the device controller 255 to determine whether they are properly functioning. For instance, the device controller 255 monitors the LEDs 265 to determine whether the LEDs 265 provide sufficient illumination. To monitor, the device controller 255 may use a light sensor 232 to provide feedback that indicates whether each LED of the LEDs 265 is providing sufficient illumination. Accordingly, the device controller 255 is able to determine whether replacement or other maintenance is necessary for the LEDs 265. In step 346, the device controller 255 may output the results of the short test to the controller 230 for output to a remote device, such as a command center 132 or server 150.

A method 350 for conducting a longer test of the exit sign repeater 300 is also illustrated in FIG. 4. In step 355, the mains power supply 210 is disconnected from the exit sign repeater 300. For example, a switch, such as a normally-closed (NC) relay (not shown), positioned between the mains terminal 215 and the converters 220 and 225 can be controlled by a signal from the device controller 255 to open. Once disconnected, the device controller 255 starts a timer in step 360. The timer is set to 90 minutes or any other desired duration, which may be specified by government regulations or other standards. In step 365, the device controller 255 monitors the LEDs 265 as described above with the short test. In some instances, in step 365, the device controller 255 also monitors other components of the PED 205, such as the battery 260 (e.g., to determine the state of charge of the battery 260). The device controller 255 continues to monitor the LEDs 265 and generates monitored data until, in step 370, the device controller 255 determines that the timer has expired. In step 375, the device controller 255 exports the monitored data obtained in step 365 to the controller 230 for export to the server 150 and/or command center 132.

Accordingly, the PED 205 portion of the exit sign repeater 300 may perform self-tests, and in some embodiments may even wirelessly report the results of the self-tests to a remote device. In a building having numerous signs (e.g., exit signs), self-testing and reporting capabilities enable a simplified and efficient testing of signs. Rather than individually visiting each sign, testing of the signs may be performed from a single remote location, such as the command center 132, server 150, or a remote device coupled thereto.

Figure 5:
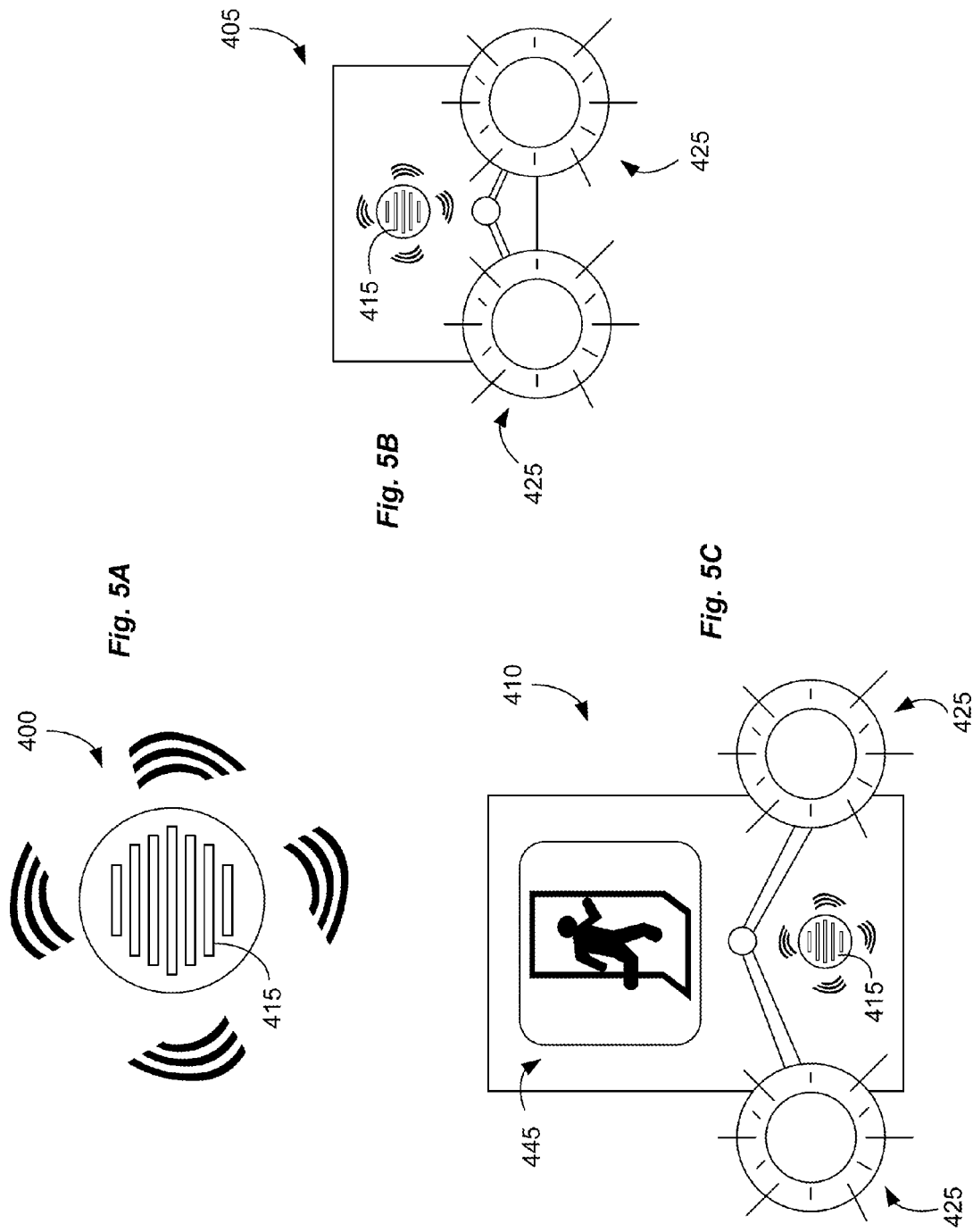
FIGS. 5A-5C illustrate alternative wireless node embodiments.

Although the wireless node 130 may be implemented as an exit sign repeater 300 as shown in FIG. 3, the wireless node 130 may take other forms as well. For instance, FIGS. 5A-C illustrate three wireless nodes 130 implemented as a speaker relay 400, an emergency light relay 405, and an alternative exit sign relay 410, respectively. The speaker relay 400, the emergency light relay 405, and the alternative exit sign relay 410 each include a unique powered emergency device (PED) 205, which is a device that conveys visual information and/or conveys audio information and/or provides illumination (e.g., emergency lighting) during an emergency situation, such as a fire, power outage, chemical spill, earthquake, etc. In some embodiments of the invention, other PEDs 205 are incorporated into wireless nodes 130—whether for emergency functions or otherwise.

The PED 205 of the speaker relay 400 illustrated in FIG. 5A includes a speaker 415. Returning to FIGS. 2A-B, the speaker 415 is coupled to the device controller 255. The speaker 415 may output audible alarm sounds, voice messages (such as emergency instructions prerecorded and stored in the device controller 255), or other audible signals. Additionally, the device controller 255 may receive voice messages from remote devices (e.g., a command center 132 or a server 150) wirelessly via antenna 245. The device controller 255 may further include a microphone (not shown) or other sensors to monitor and analyze audible signals emitted by the speaker 415 to determine whether the speaker 415 is properly functioning. The device controller 255 may also execute methods 340 and 350 for testing the PED 205 of the speaker relay 400, herein the speaker 415 is tested in addition to or instead of LEDs 265.

The PED 205 of the emergency light relay 405 of FIG. 5B includes two lights 425, although fewer or more lights 425 may be included in other embodiments. The emergency lights 425 provide lighting in case of an emergency, such as a fire, earthquake, or power outage within building 110. A light sensor 430 (see FIGS. 2A-B) can be provided to determine the level of illumination provided by emergency lights 425. An additional ambient light sensor 435 (see FIGS. 2A-B) can also or instead be provided to determine the level of ambient light outside of the emergency light relay 405. In some embodiments, if an emergency occurs and the emergency light relay 405 is within a naturally well-lit area, as determined based on the output of ambient light sensor 435, the emergency lights 425 are not illuminated. The device controller 255 may also execute methods 340 and 350 for testing the PED 205 of the emergency light relay 405, wherein the emergency lights 425 are tested in addition to or instead of LEDs 265.

FIG. 5C illustrates an alternative exit sign relay 410. The illustrated alternative exit sign relay 410 includes an exit sign 445, as well as speakers 415 and emergency lights 425, although fewer or more lights 425 may be included in other embodiments. The alternative exit sign relay 410 is, in essence, a combination of the exit sign repeater 300, speaker relay 400, and emergency lights relay 405 described above. The exit sign 445, however, includes a symbolic exit indicator for illumination, rather than textual exit indicator.

The device controller 255 determines whether to enable one or more of the LEDs 265, speaker 415, and lights 425 based upon one or more of sensor data generated by the PED 205 and external information received via antenna 245. Sensor data includes data generated by the power sensor 270 and one or more environmental sensors 440, and is also referred to herein as monitored data. For instance, sensor data from the power sensor 270 indicates a power failure of the mains power supply 210. In response, the device controller 255 may enable the LEDs 265 and/or emergency lights 425. The environmental sensors may include one or more of a carbon monoxide detector, methane or propane detector, radon detector, humidity detector, smoke detector, thermal detector, microphone, motion detector, earthquake detector, and a camera (e.g., infrared, visible spectrum, video, and/or still-image). The device controller 255 can also store thresholds associated with the various environmental sensors 440. For example, if the device controller 255 determines that the carbon monoxide detector is sensing carbon monoxide levels that exceed a certain level, the device controller 255 may generate an alarm by using the speaker 415 and by flashing the emergency lights 425 and/or LEDs 265. In another example, the device controller 255 receives an indication from a motion detector or camera that motion or a person is detected. If the motion or person is detected after normal business hours, the device controller 255 may generate an alarm by using speaker 415 and/or flashing the emergency lights 425 and/or LEDs 265. In embodiments that include a dynamic message portion (e.g., an LED display screen), the particular type of alarm condition may be displayed. For instance, the dynamic message portion may display "CARBON MONOXIDE LEAK," if excessive levels of carbon monoxide are detected, or display "BREAK-IN," if motion is detected after normal business hours.

The device controller 255 may also report abnormal sensor data, alarm conditions, or any of the monitored data described herein to a remote device (e.g., the command center 132 or server 150). For instance, if one or more of the parameters monitored by the environmental sensors 440 crosses one or more thresholds, the device controller 255 may report the sensor data. For example, if the humidity nearby the wireless node 130 within the building 110 exceeds a predetermined threshold (such as would be present in a steam leak or flooding condition), the device controller 255 may output the detected humidity level to the command center 132. Maintenance personnel for the building 110 may then be notified either by a person at the command center 132 or automatically by the command center 132. If the sensor data indicates a more perilous situation, the device controller 255 may notify government authorities or other security personnel (e.g., via the command center 132 or server 150).

Figure 6:
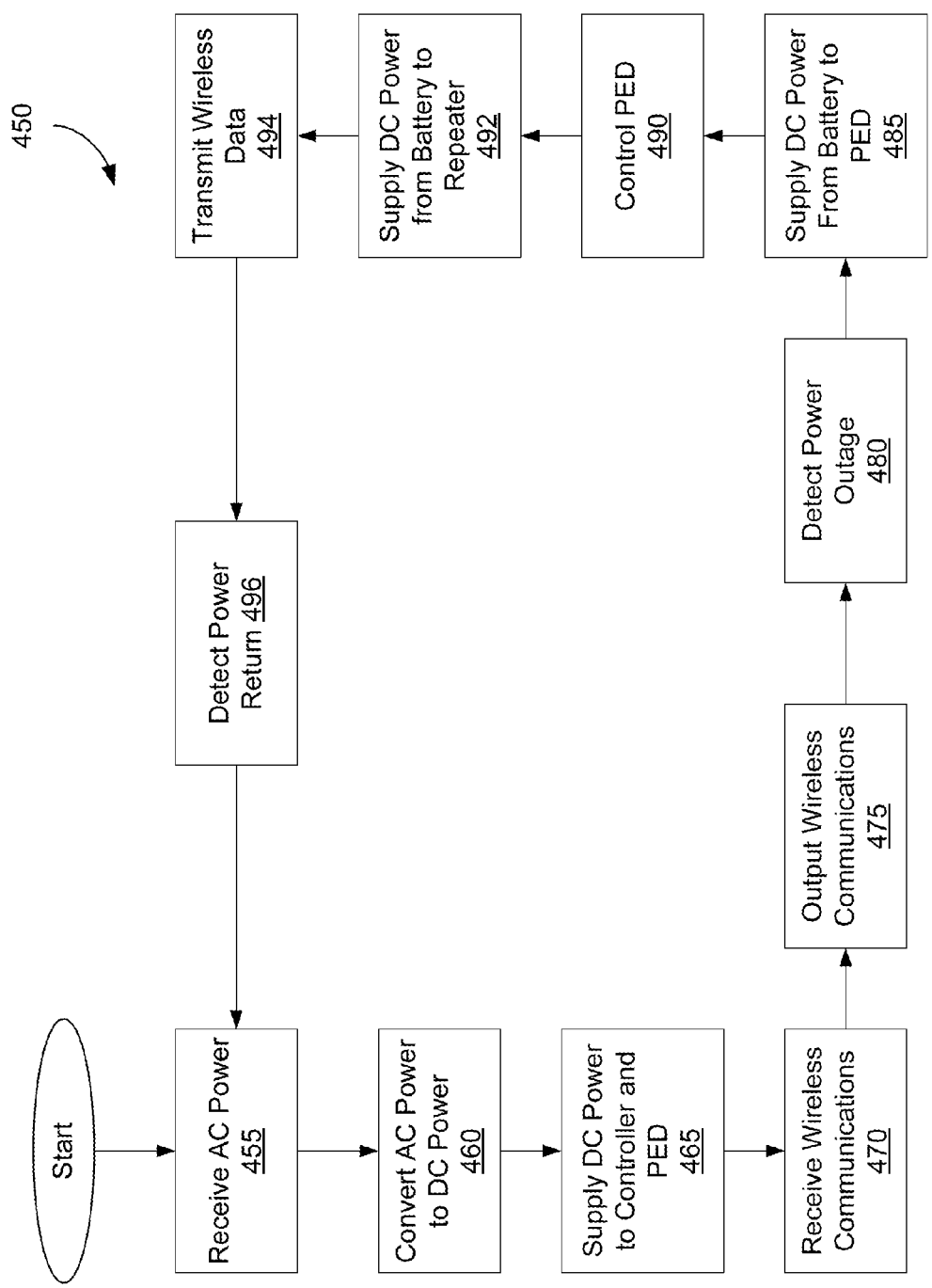
FIG. 6 illustrates a method of receiving and transmitting wireless smart grid communications.

FIG. 6 illustrates a method 450 for repeating wireless smart grid communications between a meter 125 and a wireless access point 135 using a wireless node 130. In step 455, the wireless node 130 receives AC power from the mains power supply 210 (an external power source). In step 460, the PED AC/DC converter 220 and AC/DC converter 225 convert AC power to DC power. In step 465, the DC power is supplied to the controller 230 and the device controller 255 of the PED 205. In step 470, the wireless node 130 receives, via the antenna 245, wireless smart grid communications from the smart grid meter 125 or from the wireless access point 135. In step 475, the wireless node 130 outputs, via the antenna 245, the wireless smart grid communications to the wireless access point 135 or the smart grid meter 125 (whichever device did not send the communication step 470).

In step 480, the device controller 255 detects a power outage at the mains power supply 210 by monitoring, e.g., the output of power sensor 270. In step 485, the battery 260 supplies DC power to the device controller 255 of the PED 205. In step 490, the device controller 255 controls the LEDs 265, speaker 415, or emergency lights 425 to convey audio information, convey visual information, and/or provide illumination to an area outside of the housing. In step 492, the controller 230 is provided with backup power from either the battery 240 (if present) or battery 260 (if coupled to the controller 230). In step 494, the controller 230 transmits monitored data and/or repeats wireless smart grid communications between the meter(s) 125 and the smart grid network 115. The controller 230 may also output monitored data at other stages, such as in or between steps 455-475. In step 496, the device controller 255 detects the end of the power outage at the mains power supply 210 based on output of the power sensor 270, and returns to step 455.

Figure 7:
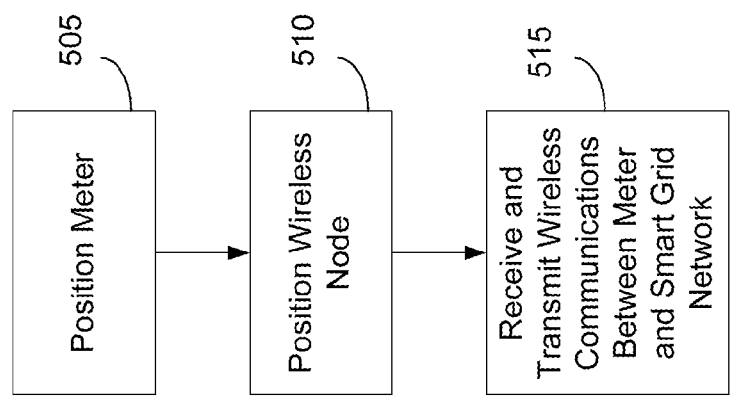
FIG. 7 illustrates a method of installing a wireless node according to embodiments of the invention.

FIG. 7 illustrates a method 500 for installing a wireless node 130 for use in a smart grid communications network 115. In step 505, the meter 125 is positioned within the building 110. For instance, an employee or contractor for a utility company or owner of a building 110 installs the meter 125 by coupling the meter 125 between power lines 120 and a local power supply network within building 110. As noted above, the meter 125 is operable to measure utility consumption and generation of the building 110, or a portion of the building 110, and to transmit and receive wireless smart grid communications. In step 510, the wireless node 130 is positioned within the building 110 in a location whereby the wireless node 130 may wirelessly communicate with both the meter 125 and the smart grid network 115. The wireless node 130 is coupled to the mains power supply 210 and secured to, for instance, a wall or ceiling within the building 110. In step 515, normal operation of the wireless node 510 commences, which includes repeating wireless communications between the meter 125 and the smart grid network 115 and in some embodiments providing a secondary powered function, such as emergency lighting. In some instances, step 515 includes execution of method 450 of FIG. 6.

In addition to the types of wireless communications described above, the wireless smart grid communications between the meter(s) 125 and the smart grid network 115 may include various utility usage and utility status-related communications. For example, the meters 125 may output utility usage information that indicates the quantity of a utility (e.g., kilowatt-hours) used by the building 110 or a portion of the building 110. In some instances, the time in which power was used may also be transmitted. For instance, the meter could report 10 kilowatt-hours used in non-peak hours, and 15 kilowatt-hours used in peak hours.

Figure 8:
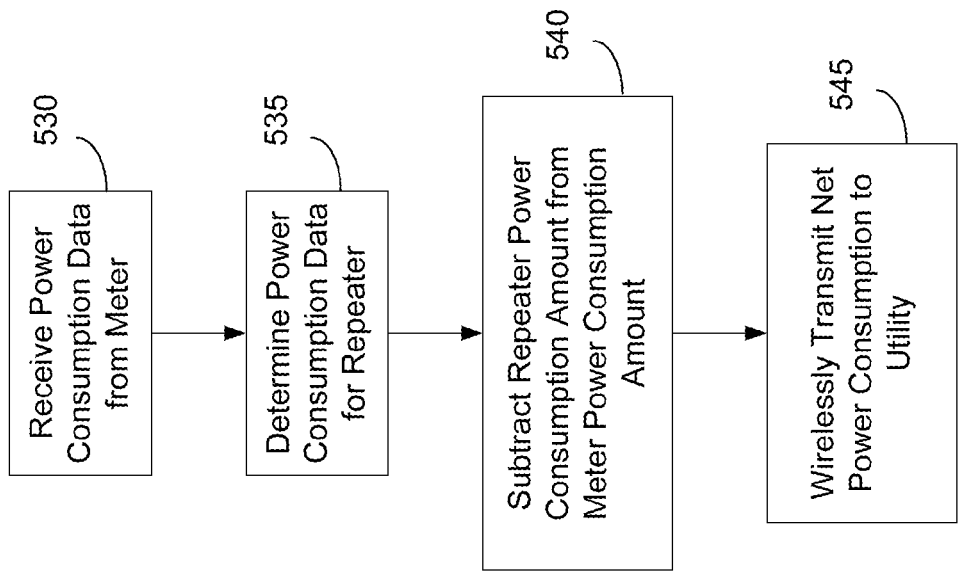
FIG. 8 illustrates a method of crediting power consumers for power consumption of the relay or wireless access point.

The utility company can calculate a bill based on the kilowatt-hours, time-of-use, and other factors. In some instances, power consumption by the repeater 200 is considered. FIG. 8 illustrates a method 525 of crediting a consumer for power consumption by repeater 200. In step 530, the wireless node 130 receives power consumption data for a particular time period (e.g., one month) from the smart meter 125. In step 535, the controller 230 determines the power consumption of the repeater 200 or WAP 200b for the same time period based on data obtained from the power sensor 280. In step 540, the controller 230 subtracts the power consumption of the repeater 200 from the power consumption reported by the meter 125 to determine a net power consumption amount. In step 545, the net power consumption amount is wirelessly transmitted by the controller 230 to the smart grid network 115. In some instances, the power consumption amounts related to the repeater 200 and meter 125 are transmitted by the relay controller 230, and the subtraction step 540 is performed by the utility company (e.g., at server 150) rather than by the controller 230. As the repeater 200 is providing a benefit to the utility company (simplified collection of power consumption data), the utility company may credit the power consumed by the repeater 200 to the party financially responsible for the power consumption tracked by the meter 125. Accordingly, the party financially responsible will not be charged for the power consumed by the repeater 200, increasing the incentive for the party to have the wireless node 130 installed in the building 110.

Although methods (e.g., methods 340, 350, 450, and 500) are described herein as being executed in a particular order, the steps of these methods may be performed in various orders. For instance, in method 500, the wireless node 510 may be installed (step 510) before the meter 125 is installed (step 505). Additionally, although described for use with electrical power grids, meters 125 may be used to measure and wirelessly transmit data for other utilities, such as water, gas, etc.

The controller 230 and device controller 255 illustrated in FIGS. 2A-B each include a processor, a memory for storing instructions executable by the processor, and various inputs/outputs for, e.g., allowing communication between the controller and other components and/or devices. In some instances, the controller is or includes a microprocessor, digital signal processor (DSP), field programmable gate array (FPGA), application specific integrated circuit (ASIC), and/or similar components.

In some embodiments, the wireless node 130 includes a repeater 200 and a non-emergency powered device, such as a clock or a light fixture, rather than a powered emergency device (PED) 205. Similar to the PED 205, a non-emergency powered device is coupled to a mains power supply 210 and, optionally, includes various sensors, controllers, backup batteries, input and output devices, etc. Similar to the wireless node 130 with PED 205, the repeater 200 of the wireless node 130 with a non-emergency powered device is generally not apparent on the exterior of the wireless node 130. Rather, the wireless node 130 takes the form of the non-emergency powered device (e.g., a clock). Non-emergency powered devices of the wireless node 130, like PEDs 205, can perform a powered function that is unrelated to (i.e., independent of) the repeater 200. For instance, the non-emergency powered devices are not LEDs on the surface of a repeater 200 that indicate the status of the repeater 200, such as whether the repeater 200 is functioning properly or transmitting data. Rather, the non-emergency powered devices may provide general illumination, convey visual information (e.g., time, date, location), or convey audio information that is independent of the repeater 200.

Figure 9:
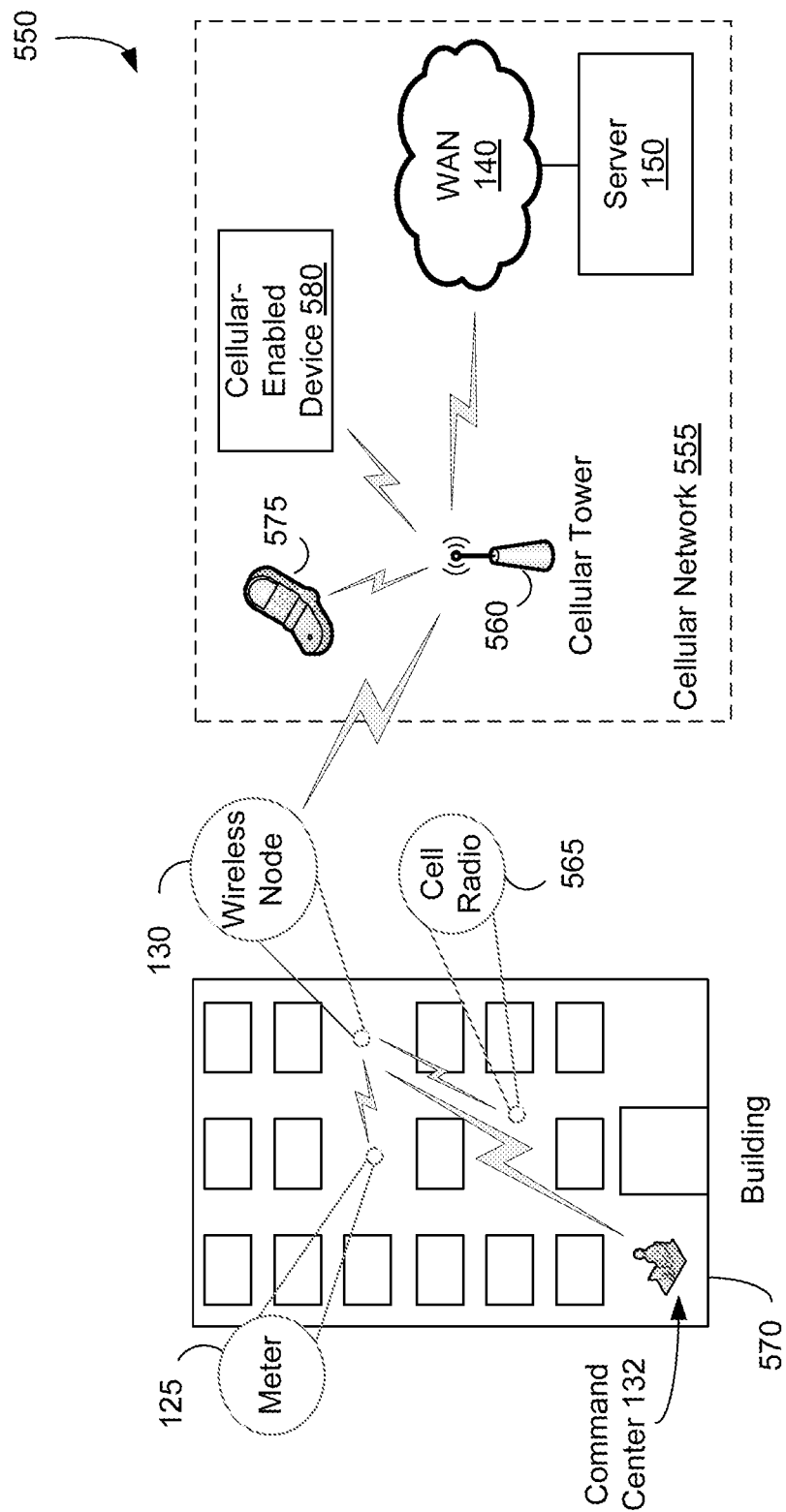
FIG. 9 illustrates a cellular communication network including a wireless node according to embodiments of the invention.

FIG. 9 illustrates a system 550 including the wireless node 130 for use in a cellular network 555 including a cellular tower 560. The system 550 includes the meter 125 and a cellular radio 565 in a building 570. The cellular radio 565 may be included in a cellular phone or a non-phone device that uses a cellular network to communicate data for a machine as part of m2m communications. The communications between the cellular radio 565 and wireless node 130 may follow one or more various communication protocols, such as Edge, 3G, 4G, Short Message Server ("SMS"), etc. The wireless node 130 receives and transmits communications between, for instance, the cellular radio 565 and any of a cellular phone 575, a cellular-enabled device 580, and the WAN 140 and server 150. The cellular-enabled device 580 may be, for instance, a machine participating in m2m communications with the cellular radio 565. The wireless node 130 is still operable to receive and transmit smart grid communications between the meter 125 and the server 150; however, the wireless node 130 communicates with the server 150 using cellular communications via the cellular tower 560.

Although the wireless node 130 is described as being used in a smart grid communication network (FIG. 1) and cellular network (FIG. 9), the wireless node 130 including a clandestine radio antenna and a PED or non-emergency powered device may be used for other types of wireless network communications. For instance, the relay 200*a* and WAP 200*b* may receive and transmit communications in other communication networks, such as WiFi, Bluetooth, and other machine-to-machine ("m2m") communication networks.

In embodiments where the wireless node 130 communicates via multiple communication protocols, the wireless node 130 may include multiple antennas, one for each protocol. For instance, the wireless node 130 of FIG. 9 may include a smart grid antenna (e.g., antenna 245 of FIGS. 2A-B) and a cellular antenna (not shown). Additional antennas may be included for additional communication protocols (e.g., Bluetooth, WiFi, etc.) or one or more antennas may each be usable for receiving and transmitting wireless communications via multiple communication protocols.

Thus, the invention provides, among other things, useful systems and methods for relaying wireless smart grid communications with clandestine relays integrated with powered emergency devices and non-emergency powered devices. Various features and advantages of the invention are set forth in the following claims.

What is claimed is:

1. A wireless node for repeating wireless communications in an environment having an external power source, the wireless node comprising:
    a power terminal for coupling to the external power source;
    a powered emergency device (PED) housing at least partially housing a powered emergency device coupled to the power terminal, wherein the power emergency device at least one of conveys audio information, conveys visual information, and provides illumination to an area outside of the PED housing;
    a repeater within the PED housing and, the repeater including:
        an antenna, and
        a repeater controller coupled to the antenna, wherein the repeater controller receives wireless communications from a first device via the antenna, and repeats the wireless communications to a second device via the antenna;
    a first AC/DC convertor associated with the repeater and having a direct connection to the power terminal and a direct connection to the repeater;
    a first battery coupled to the first AC/DC converter and having a direct connection to the repeater; and
    a second battery associated with the powered emergency device and having independent direct connections to each of the PED and the repeater;
    wherein the repeater is configured to draw power from any one of the first AC/DC convertor, the first battery, and the second battery.

2. The wireless node of claim 1, wherein the wireless communications are one of smart grid communications, cellular communications, and machine-to-machine ("m2m") network communications.

3. The wireless node of claim 1, wherein the PED housing includes a cover through which light emitted by the powered emergency device is transmitted to the area outside of the PED housing to generate a textual message.

4. The wireless node of claim 1, wherein the PED housing includes a dynamic display remotely controlled via the antenna to display a textual message.

5. The wireless node of claim 1, the PED housing further comprising the second battery providing backup power to the powered emergency device and a power sensor that monitors power input from the external power source, wherein, when the power sensor detects a power outage, the second battery provides power to components of the powered emergency device.

6. The wireless node of claim 1, wherein the PED housing is one of an exit sign housing, an emergency light housing, and a speaker housing.

7. The wireless node of claim 1, further comprising:
    the first battery providing backup power to the repeater; and
    a power sensor that monitors power input from the external power source,
    wherein when the power sensor detects a power outage, the first battery provides power to components of the repeater.

8. The wireless node of claim 7, wherein when the power sensor detects a power outage, the second battery provides power to components of both the repeater and the powered emergency device.

9. The wireless node of claim 1, wherein the powered emergency device comprises a device controller that
    disconnects the power terminal from the repeater and the powered emergency device for a testing time period;
    monitors components of the powered emergency device during the testing time period to generate monitored data; and
    transmits monitored data via the antenna to a remote device.

10. The wireless node of claim 1, further comprising a power sensor that monitors power consumed by the repeater to determine a repeater power consumption amount, and wherein:
    the wireless communications received from the first device include a power consumption amount from a utility power meter, and the repeater controller transmits to the second device, via the antenna, one of the repeater power consumption amount and a net power consumption amount equal to the power consumption amount from the utility power meter less the repeater power consumption amount;

wherein the repeater consumption amount is adjusted based on an estimated power loss factor related to the first AC/DC converter.

11. The wireless node of claim 1, wherein the at least one of audio information, visual information, and illumination is conveyed or provided to the area outside of the PED housing in response to commands received via the antenna.

12. The wireless node of claim 1, further comprising a second AC/DC convertor associated with the powered emergency device and having a direct connection to the power terminal, wherein the second battery is coupled to the second AC/DC converter.

13. A method of repeating wireless communications from a wireless device to a wireless access point with a wireless node, the wireless node including a powered emergency device (PED) housing with a powered emergency device, a power terminal for coupling to an external power source, a first AC/DC converter, a first battery, a second battery, and a repeater including an antenna and a repeater controller, wherein the repeater is within the PED housing, the method comprising:

receiving, from the external power supply, AC power at the power terminal;

converting the AC power to DC power with the first AC/DC converter;

supplying the DC power to the repeater controller and to the powered emergency device;

receiving, via the antenna, wireless communications from the wireless device;

outputting, via the antenna, the wireless communications to the wireless access point;

detecting a power outage of the external power source;

supplying DC power from the second battery to the powered emergency device; and controlling the powered emergency device to at least one of convey audio information, convey visual information, and provide illumination to an area outside of the housing, wherein the first AC/DC convertor is associated with the repeater and has a direct connection to the power terminal and a direct connection to the repeater, the first battery is coupled to the first AC/DC converter and has a direct connection to the repeater; the second battery is associated with the PED and has independent direct connections to each of the powered emergency device and the repeater, and the repeater is configured to power from any one of the first AC/DC convertor, the first battery, and the second battery.

14. The method of claim 13, further comprising, during the power outage, supplying DC power from the first battery to the repeater; and outputting, via the antenna, additional wireless communications to the wireless access point.

15. The method of claim 13, further comprising:

disconnecting, by a device controller of the powered emergency device, the power terminal from the repeater and the powered emergency device for a testing time period;

monitoring, by the device controller, at least one component of the powered emergency device during the testing time period to generate monitored data; and transmitting, by the repeater, the monitored data via the antenna to a remote device.

16. The method of claim 13, further comprising:

monitoring, with a power sensor, power consumed by the repeater to determine a repeater power consumption amount, receiving, by the repeater, a power consumption amount from the wireless device, wherein the wireless device is a smart grid meter, and transmitting to the wireless access point, by the repeater, one of the repeater power consumption amount and a net power consumption amount equal to the power consumption amount from the utility power meter less the repeater power consumption amount;

wherein the repeater consumption amount is adjusted based on an estimated power loss factor related to the first AC/DC converter.

17. The method of claim 13, further comprising: emitting light, by the powered emergency device, through a cover of the PED housing to the area outside of the PED housing to generate a textual message.

18. The method of claim 13, further comprising:

receiving commands indicating a textual message to display on a dynamic display; and controlling the dynamic display to show the textual message.

19. The method of claim 13, wherein the PED housing is one of an exit sign housing, an emergency light housing, and a speaker housing.

20. The method of claim 13, further comprising:

determining a level of an environmental characteristic via an environmental sensor;

determining that the level of the environmental characteristic exceeds a threshold; and generating an alarm in response to the exceeded threshold.

21. The method of claim 13, further comprising:

determining a level of an environmental characteristic via an environmental sensor;

determining that the level of the environmental characteristic exceeds a threshold; and wirelessly reporting the exceeded threshold to a remote device.

22. The method of claim 13, wherein the wireless communications are one of smart grid communications, cellular communications, and machine-to-machine ("m2m") network communications.

23. A method of installing a wireless node in a smart grid communications network comprising:

positioning a smart grid meter, including a wireless communication module, outside of wireless communication range of a smart grid wireless access point;

positioning the wireless node within wireless communication range of both the smart grid wireless access point and the smart grid meter, wherein the wireless node includes a housing, a power terminal for coupling to an external power source, a first AC/DC converter, a first battery, a second battery, a repeater including an antenna and a repeater controller, and a powered emergency device (PED), wherein the power terminal, the first AC/DC converter, the first battery, the second battery, the repeater, and the powered emergency device are within the housing; and wherein the wireless node receives wireless communications from the smart grid meter via an antenna, and repeats the wireless communications to the wireless access point via the antenna, and wherein the first AC/DC convertor is associated with the repeater and has a direct connection to the power terminal and a direct connection to the repeater, the first battery is coupled to the first AC/DC converter and has a direct connection to the repeater; the second battery is associated with the powered emergency device and has independent direct connections to each of the powered emergency device and the repeater, and the repeater is configured to draw power from any one of the first AC/DC convertor, the first battery, and the second battery.

24. The method of claim 23, further comprising: emitting light, by the powered emergency device, through a cover of the PED housing to the area outside of the PED housing to generate a textual message.

25. The method of claim 23, further comprising, detecting a power outage of the external power source;

supplying DC power from the second battery to the powered emergency device; and controlling the powered emergency device to at least one of convey audio information, convey visual information, and provide illumination to an area outside of the housing.

* * * * *

UNITED STATES PATENT AND TRADEMARK OFFICE
CERTIFICATE OF CORRECTION

PATENT NO. : 8,774,707 B2
APPLICATION NO. : 13/328764
DATED : July 8, 2014
INVENTOR(S) : Flammer, III et al.

Page 1 of 1

It is certified that error appears in the above-identified patent and that said Letters Patent is hereby corrected as shown below:

On the Title Page, item (73):

Delete "Reswood City, CA (US)" and insert --Redwood City, CA (US)-- therefor.

Signed and Sealed this
Twenty-second Day of December, 2015

Michelle K. Lee
*Director of the United States Patent and Trademark Office*